United States Patent
Annamraju et al.

(10) Patent No.: US 10,355,995 B2
(45) Date of Patent: Jul. 16, 2019

(54) IDENTIFYING A NETWORK CONDITION USING ESTIMATED PROCESSOR LOAD

(71) Applicant: Imagination Technologies Limited, Kings Langley (GB)

(72) Inventors: Venu Annamraju, Hyderabad (IN); Kiran Kumar Ravuri, Hyderabad (IN); Mallikarjuna Kamarthi, Hyderabad (IN)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 15/223,957

(22) Filed: Jul. 29, 2016

(65) Prior Publication Data

US 2017/0034059 A1 Feb. 2, 2017

(30) Foreign Application Priority Data

Jul. 31, 2015 (GB) .................. 1513519.7

(51) Int. Cl.
| | |
|---|---|
| *H04L 12/801* | (2013.01) |
| *H04L 29/06* | (2006.01) |
| *H04L 12/26* | (2006.01) |
| *H04L 12/811* | (2013.01) |
| *H04L 12/825* | (2013.01) |

(52) U.S. Cl.
CPC .......... *H04L 47/11* (2013.01); *H04L 43/0817* (2013.01); *H04L 43/0852* (2013.01); *H04L 47/12* (2013.01); *H04L 47/127* (2013.01); *H04L 47/25* (2013.01); *H04L 47/38* (2013.01); *H04L 65/4092* (2013.01); *H04L 65/602* (2013.01); *H04L 65/607* (2013.01); *H04L 65/608* (2013.01); *H04L 65/80* (2013.01); *H04L 43/0858* (2013.01); *H04L 43/106* (2013.01)

(58) Field of Classification Search
CPC ..... H04L 47/11; H04L 47/12; H04L 43/0852; H04L 43/106; H04L 65/608
See application file for complete search history.

(56) References Cited

U.S. PATENT DOCUMENTS

| | | | |
|---|---|---|---|
| 6,442,139 B1 | 8/2002 | Hosein | |
| 6,751,404 B1 | 6/2004 | Whitford et al. | |
| 8,868,731 B1 * | 10/2014 | Tsai | H04L 12/462 370/390 |
| 2002/0007429 A1 | 1/2002 | Boulandet et al. | |
| 2006/0233203 A1 | 10/2006 | Iwamura | |

(Continued)

FOREIGN PATENT DOCUMENTS

| | | |
|---|---|---|
| GB | 2518909 A | 4/2015 |
| GB | 2519835 A | 5/2015 |

(Continued)

*Primary Examiner* — Jamal Javaid
(74) *Attorney, Agent, or Firm* — Vorys, Sater, Seymour and Pease LLP; Vincent M DeLuca

(57) ABSTRACT

A method of identifying a network condition between a pair of network devices, wherein one of the devices comprises a processor capable of executing instructions for forming a media stream for transmission over the network, the method comprising: monitoring a measure of delay in receiving media over the network; monitoring a measure of load on the processor; and identifying a network condition in dependence on a change in the measure of delay and the measure of load on the processor.

13 Claims, 4 Drawing Sheets

(56) References Cited

U.S. PATENT DOCUMENTS

| | | |
|---|---|---|
| 2006/0277051 A1 | 12/2006 | Barriac et al. |
| 2008/0031356 A1 | 2/2008 | Uchida et al. |
| 2010/0110892 A1 | 5/2010 | Lai et al. |
| 2011/0075582 A1 | 3/2011 | Sugiyama et al. |
| 2012/0281572 A1* | 11/2012 | Lundin ............... H04L 43/0852 370/252 |
| 2013/0117842 A1* | 5/2013 | Kakadia ................ H04W 24/00 726/22 |
| 2014/0153431 A1 | 6/2014 | Lundin et al. |
| 2015/0092585 A1 | 4/2015 | Shao et al. |

FOREIGN PATENT DOCUMENTS

| | | |
|---|---|---|
| JP | 2002314595 A | 10/2002 |
| KR | 1020100133776 A | 12/2010 |
| WO | 9722201 A2 | 6/1997 |

* cited by examiner

IDENTIFYING A NETWORK CONDITION USING ESTIMATED PROCESSOR LOAD

BACKGROUND OF THE INVENTION

This invention relates to a method and device for estimating the load of a processor.

Streaming of multimedia content over the internet has become an increasingly common application in recent years. A wide range of multimedia applications, such as on-demand TV, live TV viewing, live video streaming, audio streaming, video conferencing, net meetings, video telephony, voice over internet protocol (VoIP) and many others rely on end-to-end streaming solutions. There is increasing demand for the streaming media to be played out at high quality.

High quality media usually requires a media source that can capture the media at high resolutions and frame rates (amongst other parameters). For example, many video cameras are now able to capture video in high definition (HD), 4K or even 8K resolution. Even greater resolutions are envisaged for future video applications. The raw data from such media sources is not suitable for transmission over the internet due to the high data rates. For example, HD video has a sustained data rate of over 100 MBps. The raw media data is therefore compressed before transmitting it over the internet.

Many codecs exist for compressing media data. Encoding the original media data reduces its data rate whilst maintaining a certain level of quality of the original source material. Encoding media requires significant processing capacity, especially when encoding high quality media. Processing capacity on a device is usually shared with other applications and high processing demand from other applications can lead to an increase in the processor load and a reduction in the available capacity for encoding the media. This increase in processor load may lead to delays in encoding and transmitting a media stream. Such delays can have undesirable effects such as delays in the playback of "real-time" media, packets not arriving at the playback device in a timely manner for playback, etc. There is, therefore, a need to estimate the load on a processor so that, for example, a media stream can be adapted to negate any effects caused by the load on the processor.

SUMMARY OF THE INVENTION

According to a first aspect there is provided a method of estimating processor load at a device for transmitting a media stream, the device comprising an encoder and a processor capable of executing instructions for the encoder, the method comprising: encoding a first media frame and a second media frame at the encoder; determining a first time period between a first timestamp associated with the first media frame and a second timestamp associated with the second media frame; determining a second time period between a first completion time representing completion of the encoding of the first media frame and a second completion time representing completion of the encoding of the second media frame; and forming a measure of processor load in dependence on a difference between the first and second time periods.

The device may comprise a packetizer and the first completion time is determined in dependence on the first encoded frame being received at the packetizer and the second completion time is determined in dependence on the second encoded frame being received at the packetizer.

The device may comprise a packetizer configured to packetize the encoded frames, and wherein the first completion time is determined in dependence on a first packet for the first encoded frame being output from the packetizer; and the second completion time is determined in dependence on a first packet for the second encoded frame being output from the packetizer.

The packetizer may be configured to packetize the encoded frames into RTP packets.

The method may further comprise transmitting the measure to a device for receiving the media stream.

The method may further comprise receiving a measure of delay in the network; and adjusting a transmission bandwidth for the media stream in dependence on the measure of delay and the estimated processor load.

The method may further comprise, at the receiving device: forming a measure of delay in the network; receiving the measure of processor load via the network; and adjusting the measure of delay in dependence on the measure of processor load.

The measure of network delay may be formed by: determining a third time period between receiving a first-received packet for the first media frame and receiving a first-received packet for the second media frame at a receiving device, wherein the packet for the first media frame comprises the first timestamp and the packet for the second media frame comprises the second timestamp; determining a fourth time period between the first timestamp and the second timestamp; and forming the measure of delay in dependence on the difference between the third and fourth time periods.

The measure of network delay may be formed by: determining a third time period between receiving the first media frame and receiving the second media frame, wherein the first media frame comprises the first timestamp and the second media frame comprises the second timestamp; determining a fourth time period between the first timestamp and the second timestamp; and forming the measure of delay in dependence on the difference between the third and fourth time periods.

The method may further comprise determining that the processor is overloaded if the second time period is greater than the first time period.

The method may further comprise: in response to determining that the processor is overloaded, changing parameters for encoding the media frames so as to cause a reduction in the quality of the frames to be outputted by the encoder.

According to a second aspect there is provided a method of identifying a network condition between a pair of network devices, wherein one of the devices comprises a processor capable of executing instructions for forming a media stream for transmission over the network, the method comprising: monitoring a measure of delay in receiving media over the network; monitoring a measure of load on the processor; and identifying a network condition in dependence on a change in the measure of delay and the measure of load on the processor.

The identifying step may further comprise identifying congestion in the network if the change in the measure of delay indicates an increase in network delay and the measure of load indicates that the processor is not overloaded.

The identifying step may comprise identifying that the network is not congested if the change in the measure of delay indicates an increase in network delay and the measure of load indicates that the processor is overloaded.

The step of monitoring a measure of delay may comprise: determining a first time period between receiving a first-received packet for an initial media frame and receiving a first-received packet for a subsequent media frame, wherein each received packet comprises a timestamp; determining a second time period between the timestamp of the packet for the initial media frame and the timestamp of the packet for the subsequent media frame; and forming the measure of delay in dependence on the difference between the first and second time periods.

The packets may be RTP packets. The measure of delay may be determined in dependence on RTP timestamps.

The step of monitoring a measure of delay may comprise: determining a first time period between receiving an initial media frame and receiving a subsequent media frame, wherein each received frame comprises a timestamp; determining a second time period between the timestamp of the initial media frame and the timestamp of the subsequent media frame; and forming the measure of delay in dependence on the difference between the first and second time periods.

According to a third aspect there is provided a device for transmitting a media stream, the device comprising: an encoder configured to encoding a first media frame and a second media frame; a processor capable of executing instructions for the encoder; and a controller configured to: determine a first time period between a first timestamp associated with the first media frame and a second timestamp associated with the second media frame; determine a second time period between a first completion time representing completion of the encoding of the first media frame and a second completion time representing completion of the encoding of the second media frame; and form a measure of processor load in dependence on a difference between the first and second time periods.

The device may comprise a packetizer configured to packetize the encoded frames, wherein the controller is configured to determine the first completion time in dependence on the first encoded frame being received at the packetizer and determine the second completion time in dependence on the second encoded frame being received at the packetizer.

The device may further comprising a packetizer configured to packetize the encoded frames, wherein the controller is configured to determine the first completion time in dependence on a first packet for the first encoded frame being output from the packetizer and determine the second completion time in dependence on a first packet for the second encoded frame being output from the packetizer.

The packetizer may be configured to packetize the encoded frames into RTP packets.

The controller may be configured to determine that the processor is overloaded if the second time period is greater than the first time period.

In response to determining that the processor is overloaded, the controller may be configured to change parameters for encoding the media frames so as to cause a reduction in the quality of the frames to be outputted by the encoder.

The device may further comprise a transceiver configured to transmit the measure to a device for receiving the media stream.

The transceiver may be configured to receive a measure of delay in the network; and the controller is configured to adjust a transmission bandwidth for the media stream in dependence on the measure of delay and the estimated processor load.

According to a fourth aspect there is provided a device for receiving a media stream via a network, the device comprising: a controller configured to form a measure of delay in the network; a transceiver configured to receive a measure of processor load from a device transmitting the media stream; and a controller configured to adjust the measure of delay in dependence on the measure of processor load.

The measure of network delay may be formed by: determining a first time period between receiving a first-received packet for a first media frame and receiving a first-received packet for a second media frame at the device, wherein the packet for the first media frame comprises a first timestamp and the packet for the second media frame comprises a second timestamp; determining a second time period between the first timestamp and the second timestamp; and forming the measure of delay in dependence on the difference between the first and second time periods.

The measure of network delay may be formed by: determining a first time period between receiving a first media frame and receiving a second media frame, wherein the first media frame comprises a first timestamp and the second media frame comprises a second timestamp; determining a second time period between the first timestamp and the second timestamp; and forming the measure of delay in dependence on the difference between the first and second time periods.

According to a fifth aspect there is provided a device for identifying a network condition, the device comprising a controller configured to: monitor a measure of delay in receiving a media stream over the network; monitor a measure of load on a processor capable of executing instructions for forming the media stream; and identify a network condition in dependence on a change in the measure of delay and the measure of load on the processor.

The controller may be configured to identify congestion in the network if the change in the measure of delay indicates an increase in network delay and the measure of load indicates that the processor is not overloaded.

The controller may be configured to identify that the network is not congested if the change in the measure of delay indicates an increase in network delay and the measure of load indicates that the processor is overloaded.

The controller may be configured to monitor the measure of delay by: determining a first time period between receiving a first-received packet for an initial media frame and receiving a first-received packet for a subsequent media frame, wherein each received packet comprises a timestamp; determining a second time period between the timestamp of the packet for the initial media frame and the timestamp of the packet for the subsequent media frame; and forming the measure of delay in dependence on the difference between the first and second time periods.

The packets may be RTP packets. The measure of delay may be determined in dependence on RTP timestamps.

The controller may be configured to monitor the measure of delay by: determining a first time period between receiving an initial media frame and receiving a subsequent media frame, wherein each received frame comprises a timestamp; determining a second time period between the timestamp of the initial media frame and the timestamp of the subsequent media frame; and forming the measure of delay in dependence on the difference between the first and second time periods.

According to a sixth aspect there is provided machine readable code for implementing the method described above.

According to a seventh aspect there is provided a machine readable non-transitory storage medium having encoded thereon machine readable code for implementing a method as described above.

DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
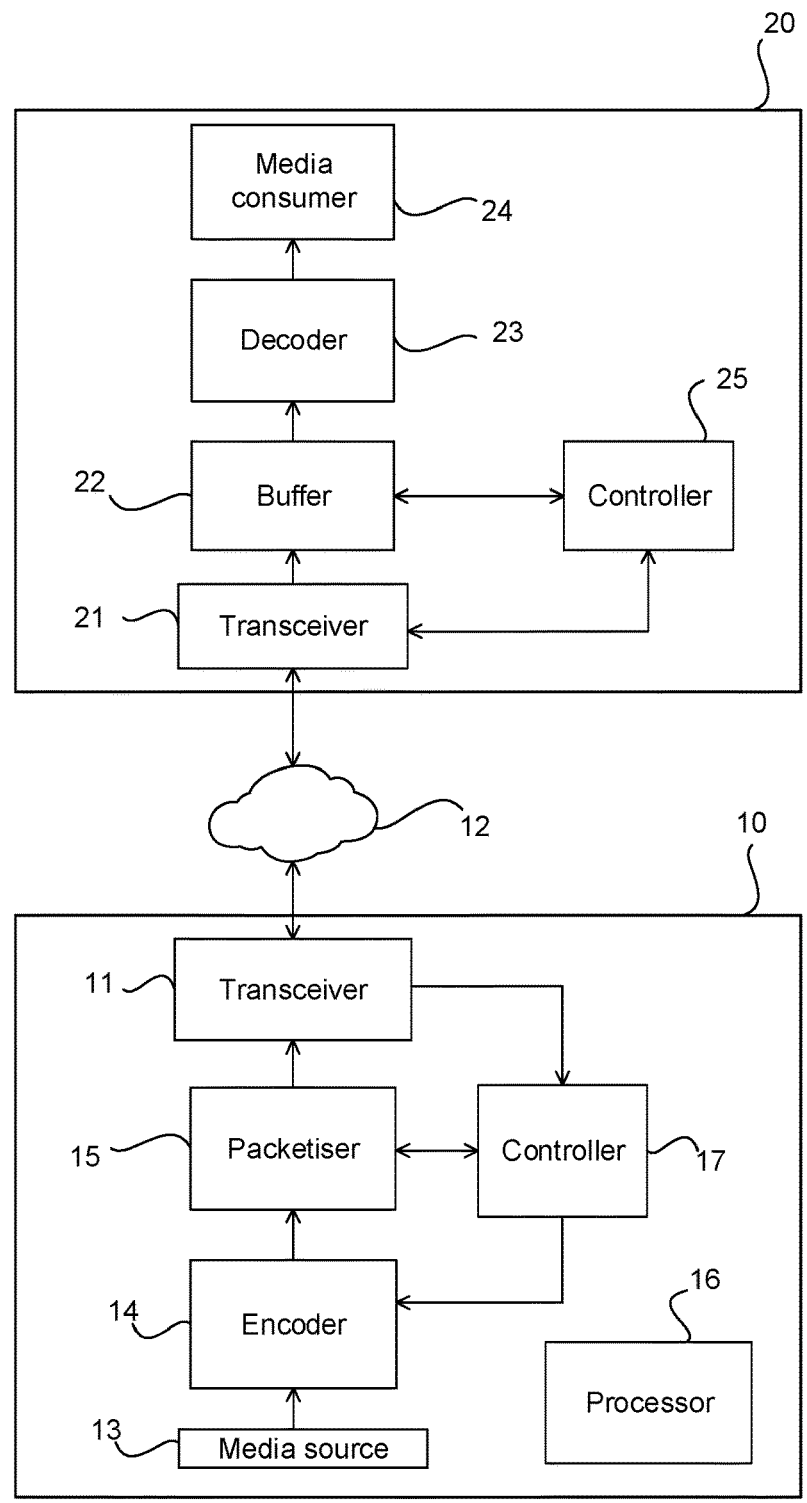
FIG. 1 shows an example of a transmitting device and a receiving device.

FIG. 1 depicts a transmitting device 10, which may be any suitable device that is capable of generating packet based data such as a computer, smartphone, videophone, etc. The transmitting device 10 comprises a transceiver 11 for connection to a communications network 12 such as the internet or other packet based networks. The transmitting device 10 can transmit and/or receive packets to and/or from the communications network 12 via the transceiver 11.

The transmitting device 10 comprises a media source 13. The media source 13 may be, for example, a camera, microphone, a storage device (e.g. flash memory, hard disk), a removable storage device (e.g. memory card, CD), a networked storage device (e.g. network drive or the cloud), an internet media provider (e.g. a streaming service), radio (e.g. DAB), etc. The media source 13 may be comprised within the transmitting device 10 or connected to the transmitting device 10 via a wired or wireless interface such as HDMI, USB, analogue line-in, I2S, S/PDIF, Bluetooth, Ethernet, Wi-Fi, DAB, etc.

The transmitting device 10 comprises an encoder 14 for encoding media data (e.g. video and/or audio data) from the media source 13. The media from the media source 13 may be provided as media frames. The encoder 14 may encode the media frames according to a coding standard such as ITU-T Recommendation H.264 or ISO/IEC International Standard 14496-10 (both also known as Advanced Video Coding (AVC)), MPEG-DASH, HTTP Live Streaming or any other suitable codec.

The transmitting device 10 may comprise a packetizer 15 which receives the encoded media frames from the encoder 14 and packetizes the frames into a sequence of packets for transmission over the network 12 via the transceiver 11. Each frame may be packetized into one or more packets. The packetizer 15 may packetize the media in accordance with a Real-time Transport Protocol (RTP) standard. Other standardised packet formats may be used. The packetizer 15 provides the packets to the transceiver 11 for transmission over the network 12 to receiving device 20.

The receiving device 20 comprises a transceiver 21 for receiving packets from the network 12. The packets may be provided to a buffer 22, which may be a jitter buffer that is capable of ordering the packets according to a playout sequence of the media data in the packets. This sequence may be indicated by a sequence number or timestamp contained in each packet. A decoder 23 decodes the packets in the order provided to it by the buffer 22 to form a media stream. The decoder 23 decodes packets according to the codec used by the encoder 13. A media consumer 24 receives the decoded media stream for playback. The media consumer 24 may be, for example, an audio and/or video player.

The transmitting device 10 comprises a processor 16 (which may be, for example, a CPU or GPU). The processor 16 executes instructions for applications running at the transmitting device 10. These instructions may come from the encoder 14 for encoding the media frames received from the media source 13, from the packetizer 15 for packetizing the encoded media frames or from any other application (not shown) that may be running at the transmitting device 10.

As mentioned above, on occasions the processor 16 may become overloaded. Generally, the processor 16 could be considered to be overloaded when other applications are utilising the majority of the processor's resources such that it affects the operation of the encoder 13. Overloading of the processor 16 may be caused by spikes in the demand, thermal throttling, rogue processes, or other reasons. Overloading of the processor 16 may lead to problems with the media stream being sent to the receiving device 20. Thus, it is desirable to determine the load on the processor 16 so that the amount of work required to be performed by the processor 16 can be appropriately adapted.

The transmission device 10 may comprise a controller 17, which is capable of estimating the load on the processor 16 and, based on the estimated load, causing the amount of work required to be carried out by the processor 16 to be adapted. For example, if the controller 17 determines that the processor 16 is overloaded, it may cause the encoder 14 to use a codec that is less demanding on the processor 16.

The controller 17 may estimate the load on the processor 16 by comparing the difference between the rate at which frames are provided to the encoder 14 and the rate at which the encoded frames are output from the encoder 14. As mentioned above, encoding media frames generally requires significant processing capacity and so measuring the amount of time the encoder 14 takes to encode a frame provides an indication of the load on the processor 16.

Each frame from the media source 13 is associated with a timestamp. The timestamp may indicate the time that the media from the media source 13 was sampled (i.e. a sampling instant) according to a clock (not shown), which may be a wallclock that is synchronised at the transmitting and receiving devices 10 and 20. The rate at which frames are provided to the encoder 14 from the media source 13 may be determined from the timestamps of those frames. The rate at which the encoded frames are output from the encoder 14 may be determined from the time that each encoded frame is received at one of the data processing units in the media processing pipeline after the encoder 14 (e.g. the packetizer 15 or transceiver 11 or any other suitable unit that may be present between the encoder 14 and transceiver 11). The input and output frame rates are compared to form to estimate the load on the processor. For example, if the output frame rate is less than the input frame rate, then this may indicate that the processor 16 is overloaded. The controller 17 may then take appropriate action to reduce the demand on the processor 16.

Preferably, the controller 17 forms a load measure for estimating the load on the processor 16. The load measure may be based on a time difference between receiving each newly encoded frame from the encoder 14 and the time of receiving a reference encoded frame from the encoder 14 and comparing that time difference against the difference in time between the timestamps of those frames. Equation 1 is an example of how the comparison could be made:

$$\text{Load measure} = (\text{CurrentFrame}Pk - \text{RefFrame}Pk) - (\text{CurrentFrameTS} - \text{RefFrameTS}) \quad (1)$$

Where CurrentFramePk is the time when the encoded current frame is received at the packetizer 15, RefFramePk is the time when an encoded reference frame is received at packetizer 15, CurrentFrameTS is the timestamp for the encoded current frame and RefFrameTS is the timestamp for the encoded reference frame. The timestamp for a frame may be comprised within that frame.

In this example and the examples below, the time at which the encoded frames are received at the packetizer 15 is determined. However, as mentioned above, the point at which the time for receiving an encoded frame is determined may be at any point after the encoding of that frame has been completed, which will usually be at some point after the encoder 14. For example, the time at which the first packet for an encoded frame is received by the transceiver 11 from the packetizer 15 may be used to determine CurrentFrameRx and RefFrameRx. The amount of processing resources used by the packetizer 15 for packetization is relatively negligible compared to encoding media and so there is no significant difference between determining the time for receiving encoded frames prior to the packetizer 15 or receiving packets for those frames after the packetizer 15.

Equation 2 is an example of how the congestion measure can be determined in a system which uses an RTP packets to send media data:

$$\text{Load measure} = (\text{CurFrameWALLTS} - \text{RefFrameWALLTS}) - [(\text{CurFrameRTPTS} - \text{RefFrameRTPTS})/90] \quad (2)$$

Where CurFrameWALLTS is the time in milliseconds when the current frame is received at the packetizer 15, RefFrameWALLTS is the time milliseconds when the reference frame is received at the packetizer 15, CurFrameRTPTS is the timestamp comprised in the current frame and RefFrameRTPTS is the timestamp comprised in the reference frame. The CurFrameRTPTS and RefFrameRTPTS timestamps may be determined and applied by the encoder based on frame rate information that is provided by the media source 13. Dividing by 90 converts the RTP time units of the timestamp into milliseconds.

The reference frame is considered to be a frame that has been encoded in the shortest time possible according to the best available knowledge. Initially, the first frame of the media stream is chosen to be the reference frame. Subsequently, the reference frame is updated whenever a frame is encoded faster than the previous reference frame.

FIGS. 2a-2d illustrate various scenarios which show how the load measure is determined and how it is used to estimate the load on the processor 16.

Figure 2A:
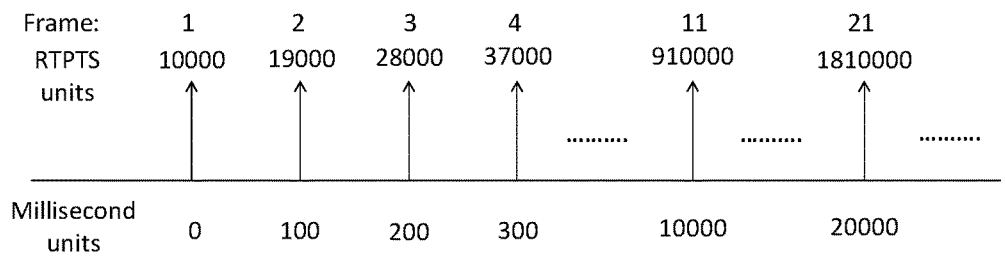
FIGS. 2a-2d illustrate frame reception timings under various processor loads and encoder parameters.

FIG. 2a illustrates a scenario where the processor 16 has a low load and is operating under normal conditions. Each arrow represents a media frame that has been encoded by the encoder 14. The RTP time stamp (RTPTS) for that frame is indicated above the arrows. The time when each encoded frame is received at the packetizer 15 is indicated by the time below the arrows (in milliseconds). This time is shown as a time relative to the first frame, but it could also be an absolute time. In this case the first frame is selected to be the reference frame. Using equation 2 for frames with an RTP timestamp, the load measure for each frame is calculated as follows:

Load measure=(0−0)−((10000−10000)/90)=0  1st frame:

Load measure=(100−0)−((19000−10000)/90)=(100−100)=0  2nd frame:

Load measure=(200−0)−((28000−10000)/90)=(200−200)=0  3rd frame:

Load measure=(300−0)−((37000−10000)/90)=(300−300)=0  4th frame:

Load measure=(10000−0)−((910000−10000)/90)= (10000−10000)=0  11th frame:

Load measure=(20000−0)−((1810000−10000)/90)= (20000−20000)=0  21st frame:

In this scenario, the load measure is a constant value of zero from the 1st frame to the 21st frame. This indicates that the frames are being encoded by the encoder 14 at the best known rate and so the processor is not overloaded and operating satisfactorily for the purposes of transmitting the media stream.

Figure 2B:
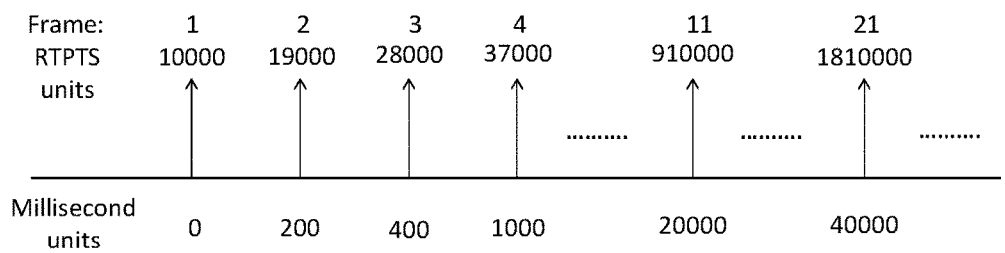

FIG. 2b illustrates a scenario where the processor 16 is overloaded. Using equation 2, the load measure for each frame is calculated as follows:

Load measure=(0−0)−((10000−10000)/90)=0  1st frame:

Load measure=(200−0)−((19000−10000)/90)=(200−100)=100  2nd frame:

Load measure=(400−0)−((28000−10000)/90)=(400−200)=200  3rd frame:

Load measure=(1000−0)−((37000−10000)/90)= (1000−300)=700  4th frame:

Load measure=(20000−0)−((910000−10000)/90)= (20000−10000)=10000  11th frame:

Congestion measure=(40000−0)−((1810000−10000)/90)=(40000−20000)=20000  21st frame:

This scenario differs from the FIG. 2a scenario as the frames for the 2nd to 21st frames are being received at the packetizer 15 in an increasingly delayed manner. When the processor 16 is overloaded, there is less processing capacity available for the encoder 14 to encode the incoming frames. Thus, it takes a longer amount of time to complete the encoding of a frame which leads to a delay in receiving the encoded frame at the packetizer 15. The slowdown at the encoder 14 can lead to a build up for frames at the input buffer of the encoder 14. This leads to the frames being increasingly delayed and so the load measure value increases for each subsequent frame. Thus, the increasing load measure indicates that the processor 16 is overloaded.

Figure 2C:
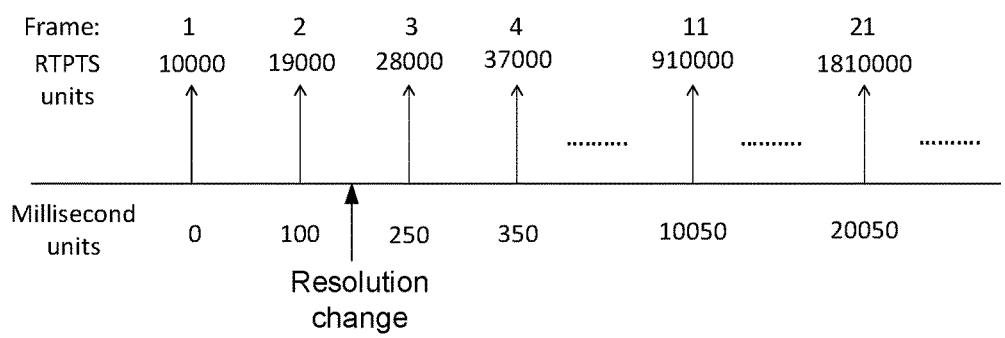

FIG. 2c illustrates a scenario where there is an increase in the time it takes the encoder 14 to encode a frame, which may be due to, for example, a change in the pixel resolution required for frames outputted by the encoder 14 or any other change that may require greater processing resources for encoding a frame. This change may have been initiated due to another control algorithm such as a network bandwidth adaptation algorithm which may adapt the transmission bitrate in response to changes in the available network bandwidth. In the example of FIG. 2c, the increase in encoding time occurs between the second and third frame due to an increase in the pixel resolution of the frames (as indicated in the figure). Using equation 2, the load measure for each frame is calculated as follows:

Load measure=(0−0)−((10000−10000)/90)=0  1st frame:

Load measure=(100−0)−((19000−10000)/90)=(100−100)=0  2nd frame:

Load measure=(250−0)−((28000−10000)/90)=(250−200)=50  3rd frame:

Load measure=(350−0)−((37000−10000)/90)=(350−300)=50  4th frame:

Load measure=(10050−0)−((910000−10000)/90)= (10050−10000)=50  11th frame:

Load measure=(20050−0)−((1810000−10000)/90)= (20050−20000)=50  21st frame:

In this scenario the load measure increases for the third frame and remains constant at that increased value for the subsequent frames. This indicates that the processor 16 is not overloaded and operating satisfactorily as the rate at which frames are inputted and outputted by the encoder 14 are the same. The increase in delay indicates, for example, that there has been an increase in the encoding time for each frame after the second frame which may be due to a change in the pixel resolution of the frames encoded by the encoder 14. Preferably, when this scenario is determined by the quality controller 15, the constant value (50, in this example), is subtracted from the calculation of the load measure until the reference frame has been updated.

Figure 2D:
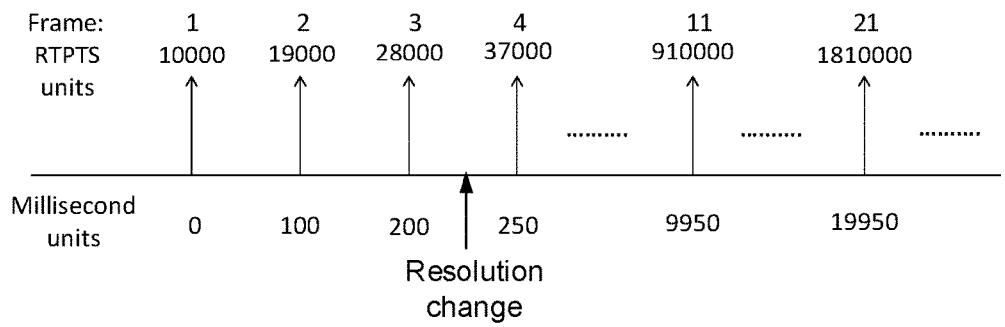

FIG. 2d illustrates a scenario where there is a decrease in the time it takes the encoder 14 to encode a frame, which may be due to, for example, a change in the pixel resolution used required for frames outputted by the encoder 14 or any other change that may require less processing resources for encoding a frame. In this example, the decrease in encoding time occurs between the third and fourth frame due to a decrease in the pixel resolution of the frames (as indicated in the figure). Using equation 2, the load measure for each frame is calculated as follows:

Load measure=(0−0)−((10000−10000)/90)=0  1st frame:

Load measure=(100−0)−((19000−10000)/90)=(100−100)=0  2nd frame:

Load measure=(200−0)−((28000−10000)/90)=(200−200)=0  3rd frame:

Load measure=(250−0)−((37000−10000)/90)=(250−300)=−50  4th frame:

Update the reference frame, RefFrame=FourthFrame

Load measure=(9950−250)−((910000−37000)/90)= (9700−9700)=0  11th frame:

Load measure=(19950−250)−((1810000−37000)/90)= (19700−19700)=0  21st frame:

In this scenario the load measure decreases for the fourth frame. The decrease indicates, for example, that there has been a change in the pixel resolution from the fourth frame which leads to a shorter amount of time being required to encode frames at the encoder 14. In this case, the fourth frame is considered to be the frame that has been encoded quicker than the first frame and so the reference frame is updated from the first frame to the fourth frame for calculating the load measure for subsequent frames.

The controller 17 may monitor changes in the load measure to determine the load on the processor 16, as described by the scenarios above. Based on the determined load on the processor the controller 17 may adapt the encoding parameters for the encoder 14 in order to reduce the demand on the processor so that frames can be transmitted in a timely manner. For example, if it is determined that the processor 16 is overloaded, the controller 17 may cause the encoder 14 to decrease the quality (e.g. by decreasing the pixel resolution) of the frames to be outputted by the encoder 14 so that the encoding process is less resource intensive. This will reduce the processing required per frame and so reduce the amount of time required to encode each frame. Other encoder parameters may be adapted by the controller 15 in response to a processor overload (such as output frame rate, bitrate, number of colours, frame types, etc). The controller 17 may be configured to cause other applications on the transmitting device 10 to reduce demand on the processor 16 if it is overloaded. This way, there will be greater processing resources available to the encoder 14 and so the quality of the media stream is capable of being maintained.

Determination of the load on the processor may be used in combination with a measure of network delay to accurately determine the condition of network 12. The condition of the network 12 may change (e.g. it may become congested), which can lead to a delay in receiving packets at the receiving device 20. This delay may lead to complete frames being received too late for them to be played out on time by the media consumer 24. Thus, it is desirable to determine if the condition of the network 12 has changed and how it has changed so that the transmitting device 10 can appropriately adapt its transmission in order to compensate for the change.

The receiving device 20 comprises a controller 25 for identifying changes in the network 12. The controller 25 is capable of determining when packets are received by the receiving device 20. The time that a packet is received may be derived from the wallclock or an internal clock (not shown), which may not necessarily be synchronised with the wallclock. The controller 25 is also capable of determining the time indicated by the timestamp comprised in each received packet. The controller 25 is capable of identifying changes in the condition of the network by comparing the times when packets are received at the receiving device 20 with the times indicated by the timestamps of those packets (as discussed in further detail below). The controller 25 may send an indication of the identified change to the transmitting device 10 so that it can appropriately adjust its transmission parameters. The controller 25 may also adjust some of its reception parameters (e.g. target jitter buffer size) in response to some network conditions.

Preferably, a congestion measure (described below) is used as the measure of network delay. However, other measures of network delay may be used, such as:
  packet round-trip time.
  measuring inter-arrival times between complete frames.
  measuring the time period between timestamps of frames or packets received over a fixed period (e.g. one second) and comparing the time period with the fixed period.
  measuring the spread between pairs of packets of varying sizes and estimate the available bandwidth as a function of the time spread between packets in a pair, and their size. Depending upon the available bandwidth, the packet pairs spread in time as they traverse the network elements.

The quality controller 25 may use the congestion measure to identify network conditions between the transmitting and receiving devices 10 and 20 such as congestion, route changes, etc. The congestion measure is determined using the inter-arrival times between each newly received frame and a reference frame. Each frame may be made up from one or more packets having the same timestamp. The inter-arrival times between frames may be determined by comparing the arrival of a complete frame or the arrival of the first-received packet for each frame. The first-received packet for each frame may not necessarily be the first packet that has been packetized or transmitted by the transmitting device 10 because of packet loss, varying network paths, etc in the network 12.

The inter-arrival times of a newly received frame and a reference frame is compared against the difference in time between the timestamps of those frames. This comparison is used to form the congestion measure. Equation 3 is an example of how the comparison could be made:

$$\text{Congestion measure} = (\text{CurrentFrameRx} - \text{RefFrameRx}) - (\text{CurrentFrameTS} - \text{RefFrameTS}) \quad (3)$$

Where CurrentFrameRx is the time when the first packet is received for the current frame at the receiving device 20, RefFrameRX is the time when the first packet is received for the reference frame at the receiving device 20, CurrentFrameTS is the timestamp for the current frame and RefFrameTS is the timestamp in the reference frame. Alternatively, CurrentFrameRx and RefFrameRX may be the times when the current frame is received and when the reference frame is received respectively.

Equation 4 is an example of how the congestion measure can be determined in a system which uses RTP packets to send media data:

$$\text{Congestion measure} = (\text{CurrentFrameRx} - \text{RefFrameRx}) - [(\text{CurrentFrameTS} - \text{RefFrameTS})/90] \quad (4)$$

Where CurrentFrameRx is the time in milliseconds when the first RTP packet is received for the current frame at the receiving device 20, RefFrameRX is the time milliseconds when the first RTP packet is received for the reference frame at the receiving device 20, CurrentFrameTS is the timestamp comprised the RTP header of the first RTP packet for the current frame and RefFrameTS is the timestamp comprised in the RTP header of the first RTP packet for the reference frame. Alternatively, CurrentFrameRx is the time in milliseconds when the current frame is received, RefFrameRX is the time milliseconds when the reference frame is received and CurrentFrameTS and RefFrameTS are the timestamps comprised in the current and reference frames respectively. Dividing by 90 converts the RTP time units into milliseconds.

If the congestion measure is zero or within some threshold that is close to zero, then it is considered that packets received from the network are "on-time" and so the network is operating satisfactorily for the purposes of the media stream. The reference frame is considered to be a frame that has arrived on-time according to the best available knowledge. Initially, the first frame of the media stream is chosen to be the reference frame. Subsequently, the reference frame is updated whenever a frame arrives on-time or within some threshold.

FIGS. 3a-3d illustrate various scenarios which show how the congestion measure can be used to determine the condition of a network.

Figure 3A:
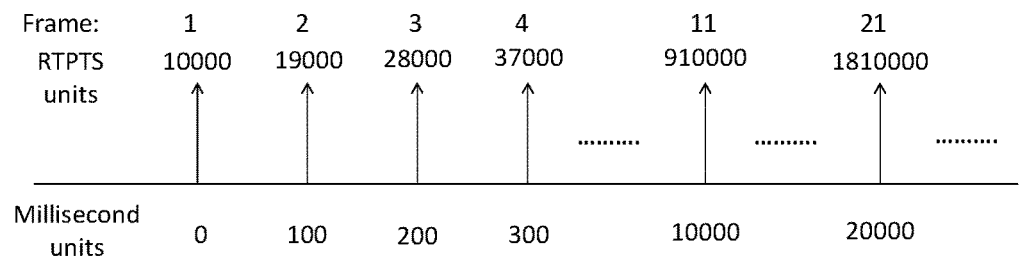
FIGS. 3a-3d illustrate frame reception timings under various network conditions.

FIG. 3a illustrates a scenario where the network is operating under normal conditions. Each arrow represents a media frame sent using the RTP protocol. The RTP time stamp (RTPTS) for that frame is indicated above the arrows. The time when then the first packet for each of the frames is received is indicated by the time below the arrows (in milliseconds). This time is shown as a time relative to the first frame, but could also be an absolute time. In this case the first frame is selected to be the reference frame. Using equation 4 for RTP packets, the congestion measure for each frame is calculated as follows:

Congestion measure=(0−0)−((10000−10000)/90)=0     1st frame:

Congestion measure=(100−0)−((19000−10000)/90)= (100−100)=0     2nd frame:

Congestion measure=(200−0)−((28000−10000)/90)= (200−200)=0     3rd frame:

Congestion measure=(300−0)−((37000−10000)/90)= (300−300)=0     4th frame:

Congestion measure=(10000−0)−((910000−10000)/ 90)=(10000−10000)=0     11th frame:

Congestion measure=(20000−0)−((1810000−10000)/ 90)=(20000−20000)=0     21st frame:

In this scenario, the congestion measure is a constant value of zero from the 1st frame to the 21st frame. This indicates that the frames are reaching the receiving device 20 on-time and so the network is operating satisfactorily for the purposes of the media stream.

Figure 3B:
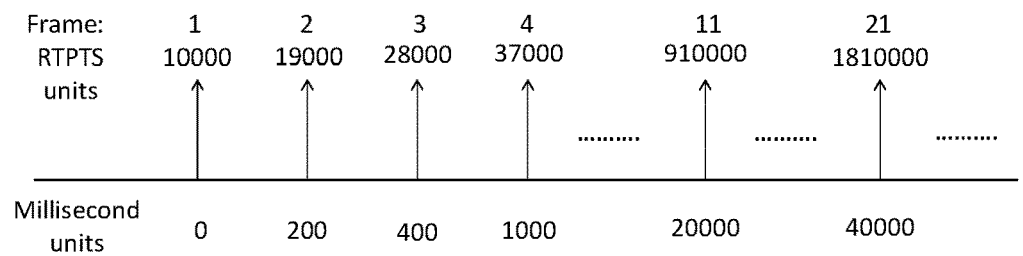

FIG. 3b illustrates a scenario where there is congestion in the network. Using equation 4, the congestion measure for each frame is calculated as follows:

Congestion measure=(0−0)−((10000−10000)/90)=0     1st frame:

Congestion measure=(200−0)−((19000−10000)/90)= (200−100)=100     2nd frame:

Congestion measure=(400−0)−((28000−10000)/90)= (400−200)=200     3rd frame:

Load measure=(1000−0)−((37000−10000)/90)= (1000−300)=700     $4^{th}$ frame:

Congestion measure=(20000−0)−((910000−10000)/ 90)=(20000−10000)=10000     11th frame:

Congestion measure=(40000−0)−((1810000−10000)/ 90)=(40000−20000)=20000     21st frame:

This scenario differs from the FIG. 3a scenario as the first-received packet for the 2nd to 21st frames are being received in an increasingly delayed manner. During congestion, the congestion measure for each frame is proportional to the mismatch between the sending rate and the bottleneck bandwidth. At other times, the congestion measure is close to zero or below some threshold indicating no congestion. The manner in which the congestion measure increases depends on the sending bandwidth, choke bandwidth (or throttling) and network usage.

Figure 3C:
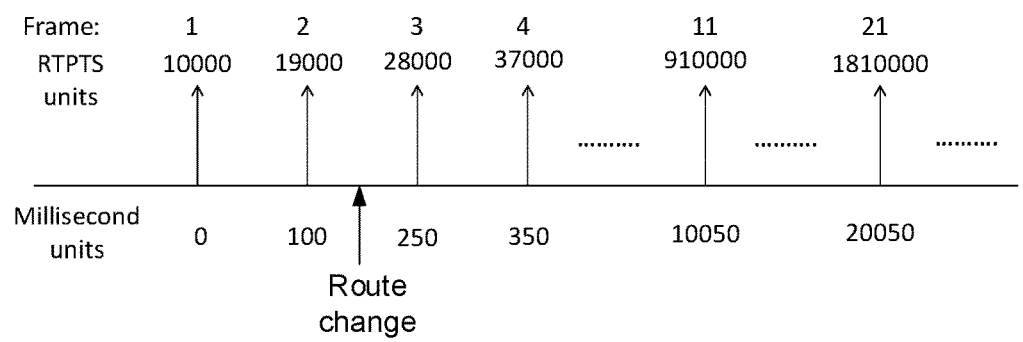

FIG. 3c illustrates a scenario where there is a single increase in network delay, which occurs between the second and third frame (as indicated in the figure). Using equation 4, the congestion measure for each frame is calculated as follows:

| | |
|---|---|
| Congestion measure=(0−0)−((10000−10000)/90)=0 | 1st frame: |
| Congestion measure=(100−0)−((19000−10000)/90)= (100−100)=0 | 2nd frame: |
| Congestion measure=(250−0)−((28000−10000)/90)= (250−200)=50 | 3rd frame: |
| Congestion measure=(350−0)−((37000−10000)/90)= (350−300)=50 | 4th frame: |
| Congestion measure=(10050−0)−((910000−10000)/ 90)=(10050−10000)=50 | 11th frame: |
| Congestion measure=(20050−0)−((1810000−10000)/ 90)=(20050−20000)=50 | 21st frame: |

In this scenario the congestion measure increases for the third frame and remains at that increased value for the subsequent frames. As the delay is constant (rather than increasing, as is the case for FIG. 3b), this indicates that the delay is not due to congestion. This increase in delay indicates, for example, that there has been a change in the network path (as depicted by the route change arrow in FIG. 3c) which leads to a longer amount of time for packets to be transported from the transmitting device 10 to the receiving device 20. Preferably, when this scenario is determined by the quality controller 25, the constant value (50, in this example), is subtracted from the calculation of the congestion measure until the reference frame has been updated.

Figure 3D:
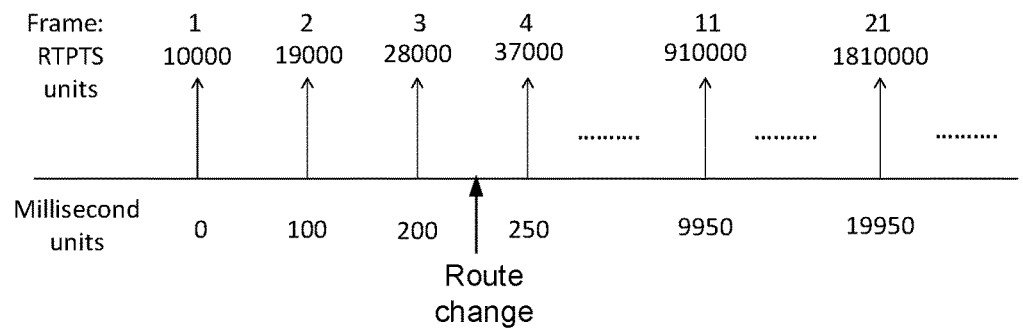

FIG. 3d illustrates a scenario where there is a single decrease in network delay, which occurs between the third and fourth frames, as indicated in the figure. Using equation 4, the congestion measure for each frame is calculated as follows:

| | |
|---|---|
| Congestion measure=(0−0)−((10000−10000)/90)=0 | 1 st frame: |
| Congestion measure=(100−0)−((19000−10000)/90)= (100−100)=0 | 2nd frame: |
| Congestion measure=(200−0)−((28000−10000)/90)= (200−200)=0 | 3rd frame: |
| Congestion measure=(250−0)−((37000−10000)/90)= (250−300)=−50 | 4th frame: |

Update the reference frame, RefFrame=FourthFrame

| | |
|---|---|
| Congestion measure=(9950−250)−((910000−37000)/ 90)=(9700−9700)=0 | 11th frame: |
| Congestion measure=(19950−250)−((1810000− 37000)/90)=(19700−19700)=0 | 21st frame: |

In this scenario the congestion measure decreases for the fourth frame. The decrease indicates, for example, that there has been a change in the network path (as depicted by the route change arrow in FIG. 3d) which leads to a shorter amount of time for packets to be transported from the transmitting device to the receiving device. In this case, the fourth frame is considered to be received on-time and so the reference frame is updated from the first frame to the fourth frame for calculating the congestion measure for subsequent frames.

Comparing the scenarios described in respect of the network congestion measure (FIG. 3a-3d) and the scenarios described in respect of the processor load measure (FIGS. 2a-2d), it can be seen that certain conditions at the transmitting device 10 may present itself as a network condition to the receiving device 20. For example, when the processor 16 at the transmitting device 10 becomes overloaded (as described above in relation to FIG. 2b), there is an increasing delay in encoding the frames. This increasing delay leads to a delayed transmission of packets, which in turn leads to a delay in receiving the packets at the receiving device 20. This leads to the receiving device 20 observing an increasing congestion measure being even though the network is behaving normally. Thus a processor overload at the transmitting device 10 presents itself as network congestion to the controller 25 at the receiving device 20. Similarly, the changes in pixel resolution described in relation to FIGS. 2c and 2d may present themselves as changes in the network path described in relation to FIGS. 3c and 3d.

The network congestion measure may be adjusted in dependence on the processor load measure to avoid any changes at the transmitting device 10 presenting themselves as changes in the network 12. This may be achieved by subtracting the processor load measure for each frame from the network congestion measure for each corresponding frame. The controller 17 at the transmitting device 10 may transmit an indication of the processor load measure for each frame to the receiving device 20. The controller 25 at the receiving device 20 may determine the congestion measure for each frame and then subtract the received load measure for the corresponding frames and use the resulting values to determine the condition of the network.

Alternatively, the controller 25 of the receiving device 20 may send the congestion measure for each frame to the transmitting device 10 so that controller 17 can determine the condition of the network 12. The controller 17 may temporally store the processor load measure for each frame the transmitting device 10 transmits and then subtract the load measure from the congestion measure it receives for each frame. The resulting value may then be used to determine the condition of the network. The transmitting device 10 may then adjust its media transmission in dependence on the determined network condition. For example, if it is determined that the network is congested, the quality controller 15 may, in response, cause the transmitting device 10 to reduce its transmission bandwidth. This may be achieved by, for example, reducing the quality of the media that is to be transmitted, increasing packet size (which reduces the packetization overhead), reducing error correction redundancy, etc. Preferably, the transmission bandwidth will be reduced to be lower than the congested network bandwidth so that further congestion can be avoided. This will ensure that transmitted media packets arrive at the receiving device in a timely manner for playback.

The load measure provides media streaming applications with a simple and resource efficient method of monitoring the load of a processor. This negates the need for any separate processes or applications for specifically monitoring and reporting the processor load to the media streaming application. The load measure may additionally be used in combination with a congestion measure to provide an accurate measure of network delay, which can then be used to reliably determine changes in the condition of a network and the causes of those changes. A transmitting device may appropriately adjust its encoding and/or transmission parameters to compensate for changes in the processor load and/or changes in the network to maintain a level of quality for playing back the media stream that a receiving device.

Figure 4:
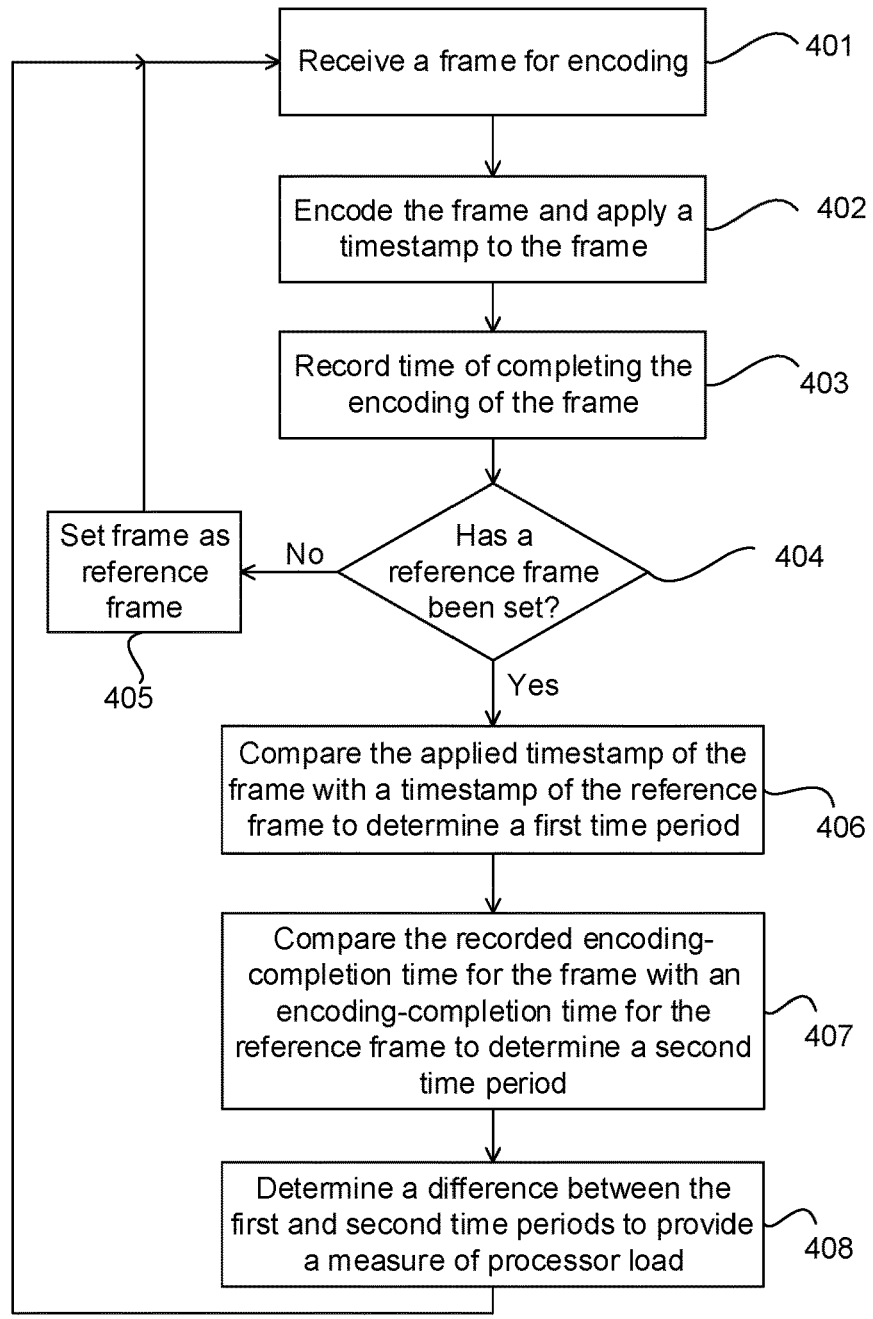
FIG. 4 is a flow diagram illustrating an example of estimating processor load.

FIG. 4 is a flow diagram illustrating an example of how the load on processor 16 may be estimated.

At step 401, the encoder 14 receives a frame for encoding from the media source 13. At step 402, the encoder encodes the frame and applies a timestamp to the frame. The timestamp may be based on the frame rate of the media outputted by the media source 13. At step 403, the time at which encoding of the frame has been completed (e.g. the when the encoded frame is received by the packetizer 15) is stored.

At step 404, it is checked if a reference frame has been set. If so, then the process proceeds to step 406. If not, then the frame is set as the reference frame at step 405 and the process returns to step 401 for the next frame received by the encoder 14.

At step 406, the applied timestamp is compared to a timestamp of the reference frame to determine a first time period. At step 407, the stored completion time (stored at step 403) is compared to a time when encoding of the reference frame was completed to determine a second time period. At step 408, the difference between the first and second time periods is determined to provide a measure of processor load.

The process of FIG. 4 may be performed for every frame received from the media source (as indicated by the process looping back to step 401).

The transmitting and receiving devices configured in accordance with the examples described herein could be embodied in hardware, software or any suitable combination of hardware and software. The transmitting devices may have the same capabilities as the receiving devices and vice versa. The devices as described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the devices, and/or heterogeneous processors comprising one or more dedicated, programmable and general purpose processing functionalities. The devices described herein can comprise one or more processors and one or more memories having program code stored thereon, the processors and the memories being such as to, in combination, provide the claimed devices and/or perform the claimed methods.

Data processing units described herein (e.g. encoder, controller and packetizer) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the methods described herein could be performed by one or more physical processing units executing program code that causes the unit(s) to perform the methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of identifying a network condition at a device for receiving a media stream over a network, the method comprising:
 receiving a measure of load on a processor configured to execute instructions to form the media stream;
 monitoring a measure of delay in receiving the media stream over the network, wherein the step of monitoring a measure of delay comprises:
  determining a first time period between receiving an initial media frame and receiving a subsequent media frame, wherein each received frame comprises a timestamp,
  determining a second time period between the timestamp of the initial media frame and the timestamp of the subsequent media frame, and
  forming the measure of delay in dependence on the difference between the first and second time periods; and
 identifying a network condition in dependence on the measure of delay and the measure of load on the processor, whereby encoding and/or transmission parameters for said media stream can be adjusted in dependence on the identified network condition to maintain a predetermined level of playback quality at a receiving device for playing back said media stream.

2. A method as claimed in claim 1, wherein the identifying step comprises identifying congestion in the network if the change in the measure of delay indicates an increase in network delay and the measure of load indicates that the processor is not overloaded.

3. A method as claimed in claim 1, wherein the identifying step comprises identifying that the network is not congested if the change in the measure of delay indicates an increase in network delay and the measure of load indicates that the processor is overloaded.

4. A method as claimed in claim 1, wherein the first time period is determined between receiving a first-received packet for the initial media frame and receiving a first-received packet for the subsequent media frame, and the second time period is determined between the timestamp of the packet for the initial media frame and the timestamp of the packet for the subsequent media frame.

5. A method as claimed in claim 4, wherein the packets are Real-time Transport Protocol (RTP) packets.

6. A method as claimed in claim 1, wherein the measure of delay is determined in dependence on Real-time Transport Protocol (RTP) timestamps.

7. A device for receiving a media stream over a network and identifying a network condition, the device comprising a controller configured to:
 monitor a measure of delay in receiving a media stream over the network by determining a first time period between receiving an initial media frame and receiving a subsequent media frame, wherein each received frame comprises a timestamp, determining a second time period between the timestamp of the initial media frame and the timestamp of the subsequent media frame, and forming the measure of delay in dependence on the difference between the first and second time periods;

receive a measure of load on a processor configured to execute instructions to form the media stream; and identify the network condition in dependence on the measure of delay and the measure of load on the processor, whereby encoding and/or transmission parameters for said media stream can be adjusted in dependence on the identified network condition to maintain a predetermined level of playback quality at a receiving device for playing back said media stream.

8. A device as claimed in claim 7, wherein the controller is configured to identify congestion in the network if the change in the measure of delay indicates an increase in network delay and the measure of load indicates that the processor is not overloaded.

9. A device as claimed in claim 7, wherein the controller is configured to identify that the network is not congested if the change in the measure of delay indicates an increase in network delay and the measure of load indicates that the processor is overloaded.

10. A device as claimed in claim 7, wherein the first time period is determined between receiving a first-received packet for the initial media frame and receiving a first-received packet for the subsequent media frame and the second time period is determined between the timestamp of the packet for the initial media frame and the timestamp of the packet for the subsequent media frame.

11. A device as claimed in claim 10, wherein the packets are Real-time Transport Protocol (RTP) packets.

12. A device as claimed in claim 7, wherein the measure of delay is determined in dependence on Real-time Transport Protocol (RTP) timestamps.

13. A machine readable non-transitory storage medium having encoded thereon machine readable code for implementing a method of identifying a network condition at a device for receiving a media stream over a network, the method comprising:

receiving a measure of load on a processor configured to execute instructions to form the media stream;

monitoring a measure of delay in receiving the media stream over the network, wherein the step of monitoring a measure of delay comprises:

determining a first time period between receiving an initial media frame and receiving a subsequent media frame, wherein each received frame comprises a timestamp;

determining a second time period between the timestamp of the initial media frame and the timestamp of the subsequent media frame; and forming the measure of delay in dependence on the difference between the first and second time periods; and identifying a network condition in dependence on the measure of delay and the measure of load on the processor, whereby encoding and/or transmission parameters for said media stream can be adjusted in dependence on the identified network condition to maintain a predetermined level of playback quality at a receiving device for playing back said media stream.

* * * * *